United States Patent
Hsieh et al.

(10) Patent No.: US 7,826,533 B2
(45) Date of Patent: Nov. 2, 2010

(54) METHOD FOR OBJECT EDGE DETECTION IN MACROBLOCK AND METHOD FOR DECIDING QUANTIZATION SCALING FACTOR

(75) Inventors: Pai-Chu Hsieh, Taipei (TW); Tzu-Hsin Wang, Hsinchu (TW); Chien-Yu Lin, Sanchong (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1502 days.

(21) Appl. No.: 11/188,040

(22) Filed: Jul. 22, 2005

(65) Prior Publication Data

US 2006/0257038 A1 Nov. 16, 2006

(30) Foreign Application Priority Data

May 10, 2005 (TW) .............................. 94115008 A (51) Int. Cl.
*H04N 7/18* (2006.01)

(52) U.S. Cl. .......................... 375/240.24; 375/240.04; 375/240.05

(58) Field of Classification Search ................................ 375/240.01–240.29
See application file for complete search history.

(56) References Cited

U.S. PATENT DOCUMENTS 6,741,655 B1 * 5/2004 Chang et al. ........... 375/240.26
6,782,135 B1 * 8/2004 Viscito et al. ............... 382/239

* cited by examiner

*Primary Examiner*—Andy S Rao
(74) *Attorney, Agent, or Firm*—J.C. Patents (57) ABSTRACT

A method for object edge detection in a macroblock and a method for deciding quantization scaling factor are disclosed. This method calculates and compares the pixel means and means of absolutely difference of a plurality of pixel blocks in a macroblock to achieve the purpose of detecting if there is an object edge or flat area in a macroblock. In the meantime, the image structure of macroblock is analyzed and classified and its related messages are used for bit rate control, such that the visual effect of the compressed image can be appropriately enhanced.

16 Claims, 9 Drawing Sheets

METHOD FOR OBJECT EDGE DETECTION IN MACROBLOCK AND METHOD FOR DECIDING QUANTIZATION SCALING FACTOR

CROSS-REFERENCE TO RELATED APPLICATION

This application claims the priority benefit of Taiwan application serial no. 94115008, filed on May 10, 2005. All disclosure of the Taiwan application is incorporated herein by reference.

BACKGROUND OF THE INVENTION

1. Field of the Invention

The present invention relates to a method for deciding a quantization scaling factor, and more particularly, to a method for deciding a quantization scaling factor based on the object edge strength and the flat area strength of the image.

2. Description of the Related Art

Figure 1:
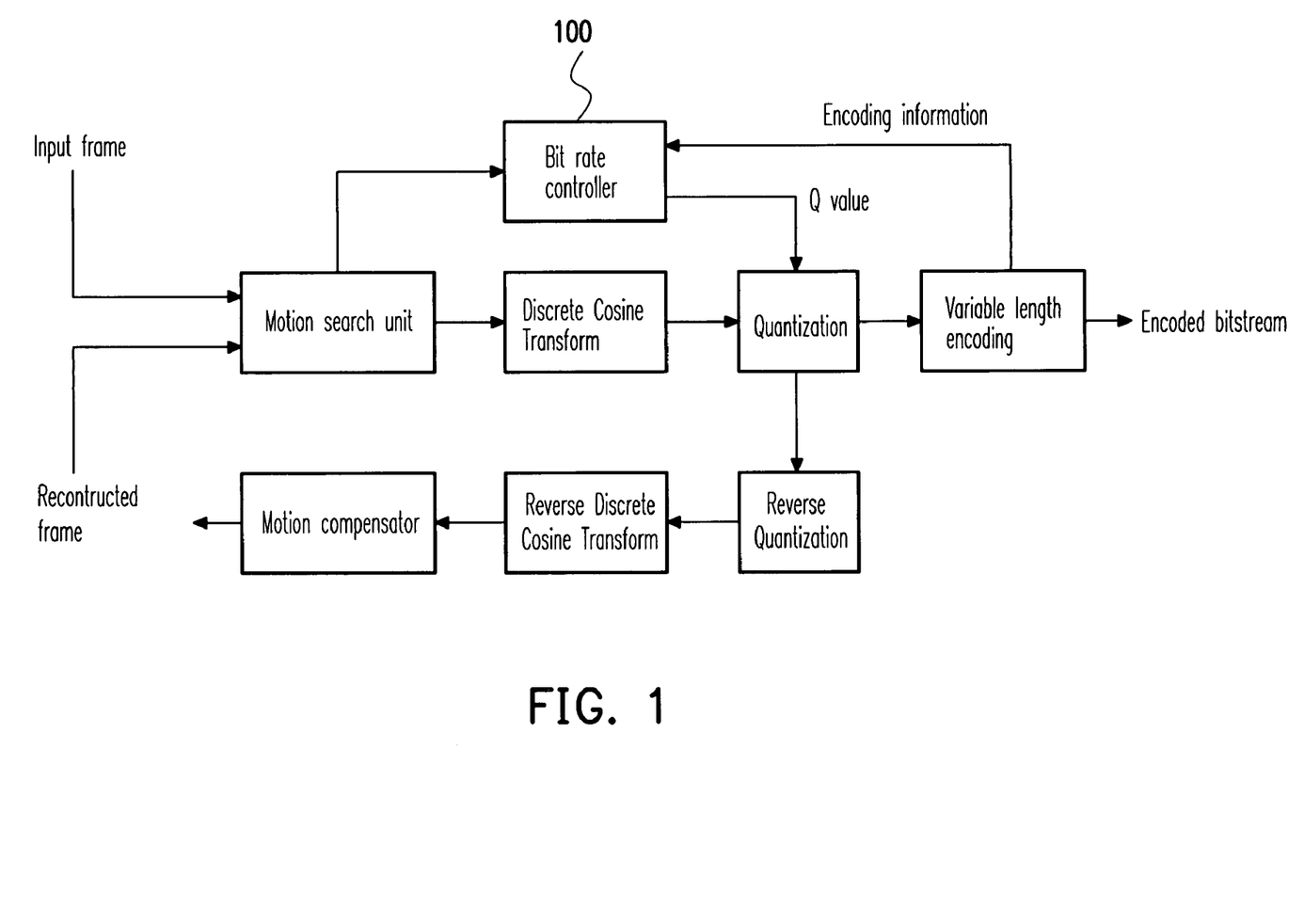
FIG. 1 schematically shows a block diagram of an image encoder with a bit rate controller.

FIG. 1 schematically shows a block diagram of an image encoder with a bit rate controller 100. In order to control the data size, when the discrete cosine transform coefficients (DCT) are quantized by the image encoder, the quantizing steps need to be adjusted based on the quantization scaling factor (i.e. Q value), which is determined by the bit rate controller 100. Accordingly, the algorithm of generating the quantization scaling factor by the bit rate controller has significantly impact on the quality of the image compression.

In the prior art, the basic method of the bit rate controller is to increase the quality of image compression as much as possible in a predetermined data size. In recent years, visual mentality has been further considered, such that the distortion of the compressed image is not easily recognized by the viewer and the sensitive area of human eyes on the image quality is also appropriately improved. However, the items that can be detected and recognized by the visual mentality are still not versatile enough; and most of the detection items are just like bright or dark, simple or complex, fast moving or still picture, . . . , etc. How to integrate the detection of object edge and flat area, which are important to the visual mentality, into the process of image compression has not been developed.

SUMMARY OF THE INVENTION

Therefore, it is an object of the present invention to provide a method for detecting an object edge in a macroblock. In the detecting method, first the macroblock is divided into a plurality of pixel blocks of different sizes, so as to calculate its pixel means and means of absolutely difference for further analysis and comparison. Then, the object is edge and flat area of the macroblock are detected and provided to the bit rate controller, so as to achieve the object of improving the image visual effect.

It is another object of the present invention to provide a method for deciding a quantization scaling factor. The deciding method controls the bit rate of the image encoding based on the received information of object edge and flat area, and adjusts the quantization scaling factor based on the strength of object edge and flat area, so as to achieve the object of improving the image visual effect.

The present invention provides a method for detecting the object edge in a macroblock. Wherein, the macroblock is one of the macroblocks in an image picture. The detecting method comprises the following steps. First, the macroblock is divided into a plurality of pixel blocks. Then, the pixel mean of each of the pixel blocks is calculated, and the pixel means of these pixel blocks are compared, so as to determine whether the macroblock has an object edge or not.

In the method for detecting the object edge in a macroblock according to a preferred embodiment of the present invention, the method of comparing the pixel means of the pixel blocks further comprises the following steps. First, a maximum pixel mean and a minimum pixel mean with maximum and minimum values are found from the pixel means. Then, the minimum pixel mean is multiplied by an edge scaling factor, so as to obtain a comparison pixel mean; and the comparison pixel mean is subsequently compared with the maximum pixel mean. Finally, if the comparison pixel mean is less than the maximum pixel mean, it is determined that the macroblock has an object edge.

The method for detecting the object edge in a macroblock according to the preferred embodiment of the present invention further comprises the following steps. First, a first object edge strength and a second object edge strength are detected based on a first edge scaling factor and a second edge scaling factor. Then, the first object edge strength is compared with the second object edge strength, so as to distinguish the strength of the object edge.

In the method for detecting the object edge in a macroblock according to the preferred embodiment of the present invention, the formula to calculate the pixel mean of the pixel block having m pixels width and n pixels height is:

$$\text{mean} = \frac{\left( \sum_{i=0}^{n} \sum_{j=0}^{m} \text{pixel}_{i,j} \right)}{(n \times m)}$$

Where mean is the pixel mean, $\text{pixel}_{i,j}$ is the pixel value of the $(i+1)^{th}$ column and $(j+1)^{th}$ row pixel in the pixel block; m and n are natural numbers, and i and j are positive integers equal to and greater than 0.

The method for detecting the object edge in a macroblock according to the preferred embodiment of the present invention further comprises: calculating the mean of absolutely difference for each pixel block; and determining whether the macroblock has a flat area or not based on the means of absolutely difference of the pixel blocks.

In the method for detecting the object edge in a macroblock according to the preferred embodiment of the present invention, the step of comparing the means of absolutely difference of the pixel blocks mentioned above comprises: comparing the mean of absolutely difference of each pixel block with a flat level; and if the means of absolutely difference are less than the flat level, determining these pixel blocks have flat area.

In the method for detecting the object edge in a macroblock according to the preferred embodiment of the present invention, the step of comparing the means of absolutely difference of these pixel blocks mentioned above comprises: finding a maximum mean of absolutely difference from the means of absolutely difference; comparing the maximum mean of absolutely difference with a flat level; and if the maximum mean of absolutely difference is less than the flat level, determining the macroblock has a flat area.

In the method for detecting the object edge in a macroblock according to the preferred embodiment of the present invention, the formula to calculate the mean of absolutely difference of the pixel block having m pixels width and n pixels height is:

$$MAD = \sum_{i=0}^{n} \sum_{j=0}^{m} |(pixel_{i,j} - \text{mean})|$$

Where MAD is the mean of absolutely difference, mean is the pixel mean, $pixel_{i,j}$ is the pixel value of the $(i+1)^{th}$ column and $(j+1)^{th}$ row pixel in the pixel block; m and n are natural numbers, and i and j are positive integers equal to and greater than 0.

The method for detecting the object edge in a macroblock according to the preferred embodiment of the present invention further comprises: reassembling the macroblock based on an image structure of the macroblock.

In the method for detecting the object edge in a macroblock according to the preferred embodiment of the present invention, wherein if the image structure is a frame type, the pixel lines of two fields are interlaced with each other to form the macroblock; and if the image structure is a field type, the pixel lines of two fields in two blocks are individually arranged and the two blocks are reassembled to form the macroblock.

The present invention provides a method for deciding the quantization scaling factor suitable for controlling the bit rate of image encoding in a macroblock. The deciding method comprises the following steps. First, it is to detect whether the macroblock has an object edge or not. If the macroblock has an object edge, the quantization scaling factor is decreased. Then, it is to detect whether the macroblock has a flat area or not. If the macroblock has a flat area, the quantization scaling factor is increased.

In the method for deciding the quantization scaling factor according to a preferred embodiment of the present invention, the step of determining whether the macroblock has an object edge or not mentioned above further comprises: detecting an object edge strength and comparing the object edge strength with a predetermined strength; if the object edge strength is greater than the predetermined strength, decreasing a first scaling amount from the quantization scaling factor; otherwise, if the object edge strength is less than the predetermined strength, decreasing a second scaling amount from the quantization scaling factor, wherein the first scaling amount is greater than the second scaling amount.

In the method for deciding the quantization scaling factor according to the preferred embodiment of the present invention, the step of determining whether the macroblock has an object edge or not mentioned above further comprises: detecting a flat area strength and comparing the flat area strength with a predetermined strength; if the flat area strength is greater than the predetermined strength, increasing a first scaling amount to the quantization scaling factor; otherwise, if the flat area strength is less than the predetermined strength, increasing a second scaling amount to the quantization scaling factor, wherein the first scaling amount is greater than the second scaling amount.

In the method for deciding the quantization scaling factor according to the preferred embodiment of the present invention, wherein if both the object edge and the flat area are detected, the object edge will be primarily considered for adjusting the quantization scaling factor.

In the present invention, besides the conventional visual mentality, it further considers the detection of object edge and flat area. Moreover, the related information is transmitted to the bit rate controller for further process, such that an optimal quantization scaling factor is obtained. Accordingly, the quality of compressed image is improved, the visual effect is more smooth, and the shortcomings of not considering the visual mentality factors such as object edge and flat area in the prior art are effectively solved.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION PREFERRED EMBODIMENTS

In order to have the image encoder not only accomplish the visual mentality classification but also detect the object edge and the flat area during the compression and encoding process, the related information has to be processed by the bit rate controller first for generating the optimal quantization scaling factor, such that the quality of compressed image is improved and the visual effect is more smooth. The present invention calculates the pixel means and the means of absolutely difference for a plurality of pixel blocks in the macroblock and cooperates with a mechanism of determining the object edge or the flat area, so as to understand the image characteristic of the macroblock. In addition, this message is transmitted to the bit rate controller, and the bit rate controller determines the optimal quantization scaling factor based on the image content, so as to further improve the real image quality and the visual effect of the compressed image.

Figure 2:
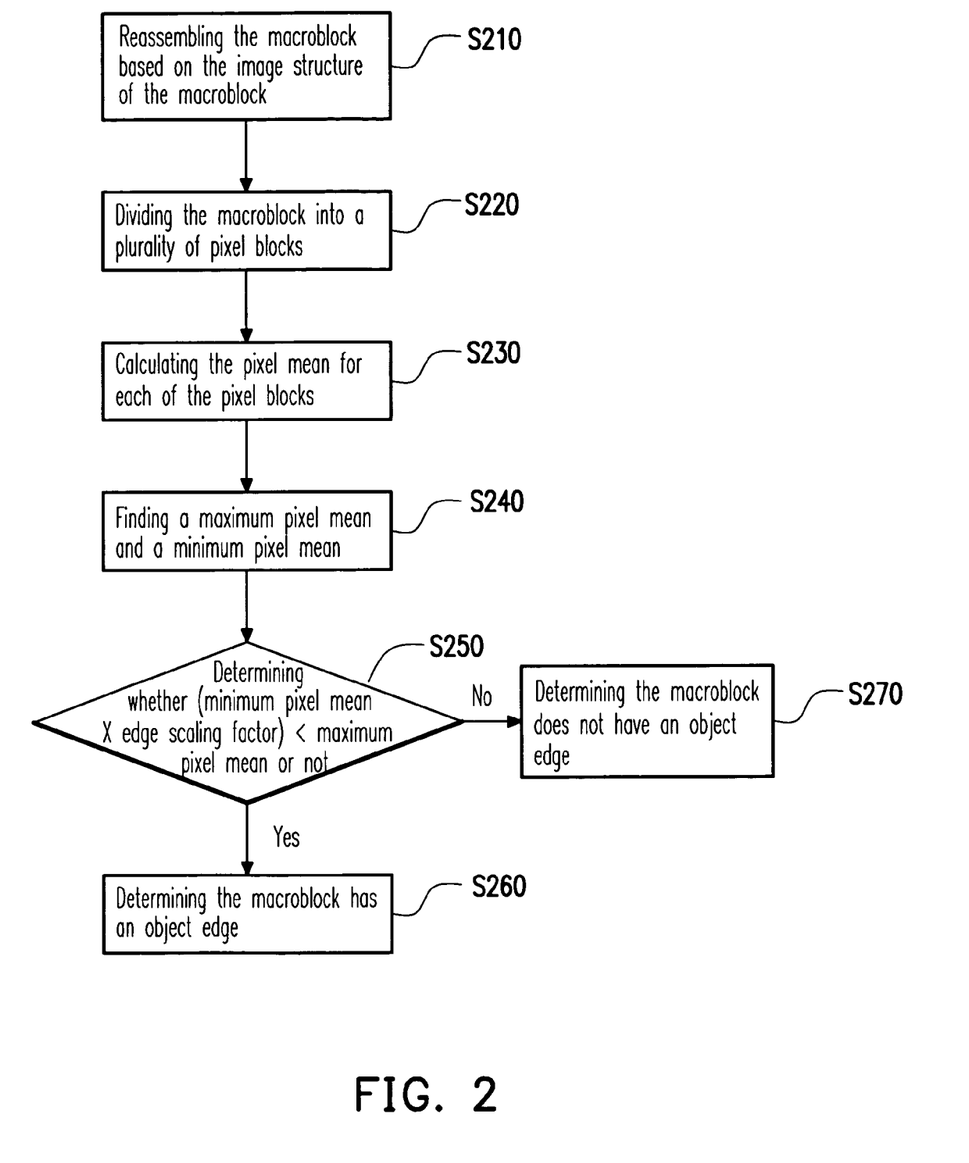
FIG. 2 schematically shows a flow chart illustrating a method for detecting the object edge in a macroblock according to a preferred embodiment of the present invention.

FIG. 2 schematically shows a flow chart illustrating a method for detecting the object edge in a macroblock according to a preferred embodiment of the present invention. First, the macroblock is reassembled based on the image structure of the macroblock (step S210). Then, the macroblock is divided into a plurality of pixel blocks (step S220), and the pixel mean for each of the pixel blocks is calculated (step S230). Then, a maximum pixel mean and a minimum pixel mean are found from the pixel means (step S240).

Afterwards, the minimum pixel mean is multiplied by an edge scaling factor, and whether it is less than the maximum pixel mean or not is determined (step S250). If the result value obtained from multiplying the minimum pixel mean by the edge scaling factor is less than the maximum pixel mean, it is determined that the macroblock has an object edge (step S260). Otherwise, it is determined that the macroblock does not have an object edge (step S270). Wherein, the formula to calculate the pixel mean of the pixel block having m pixels width and n pixels height is:

$$mean = \frac{\left(\sum_{i=0}^{n}\sum_{j=0}^{m} pixel_{i,j}\right)}{(n \times m)}$$

Where mean is the pixel mean, $pixel_{i,j}$ is the pixel value of the $(i+1)^{th}$ column and $(j+1)^{th}$ row pixel in the pixel block; m and n are natural numbers, and i and j are positive integers equal to and greater than 0.

Figure 3:
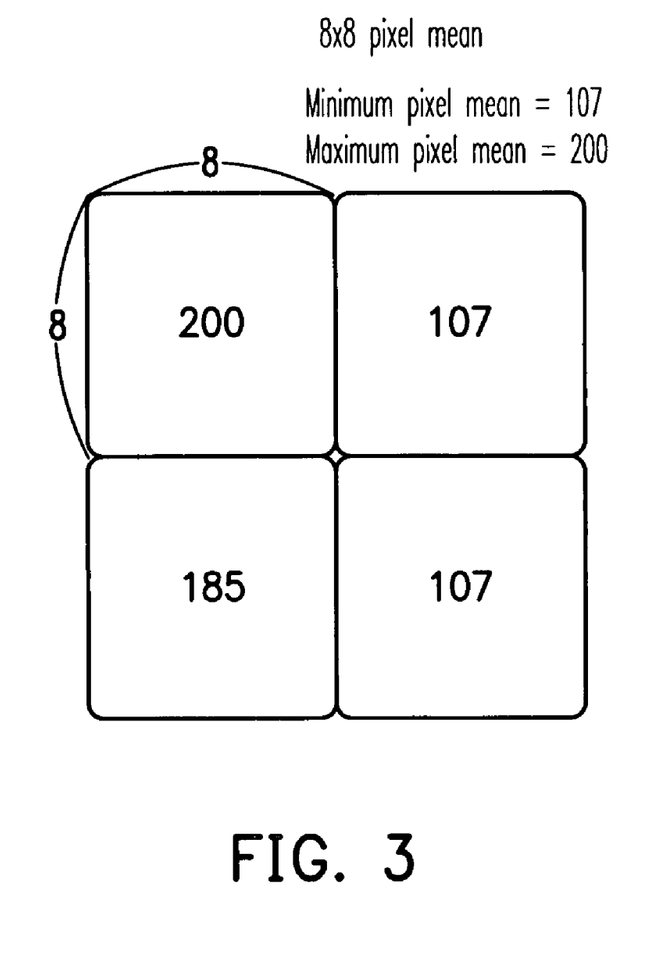
FIG. 3 schematically shows an example of a method for detecting the object edge in a macroblock according to a preferred embodiment of the present invention.

FIG. 3 schematically shows an example of a method for detecting the object edge in a macroblock according to a preferred embodiment of the present invention. First, the present embodiment divides a 16×16 macroblock into 4 8×8 macroblocks, and calculates the pixel mean for each of the macroblocks respectively. Then, a maximum pixel mean and a minimum pixel mean are found from the pixel means and compared with each other. If the minimum pixel mean is much less than the maximum pixel mean, it is determined that the macroblock has an object edge.

Figure 4:
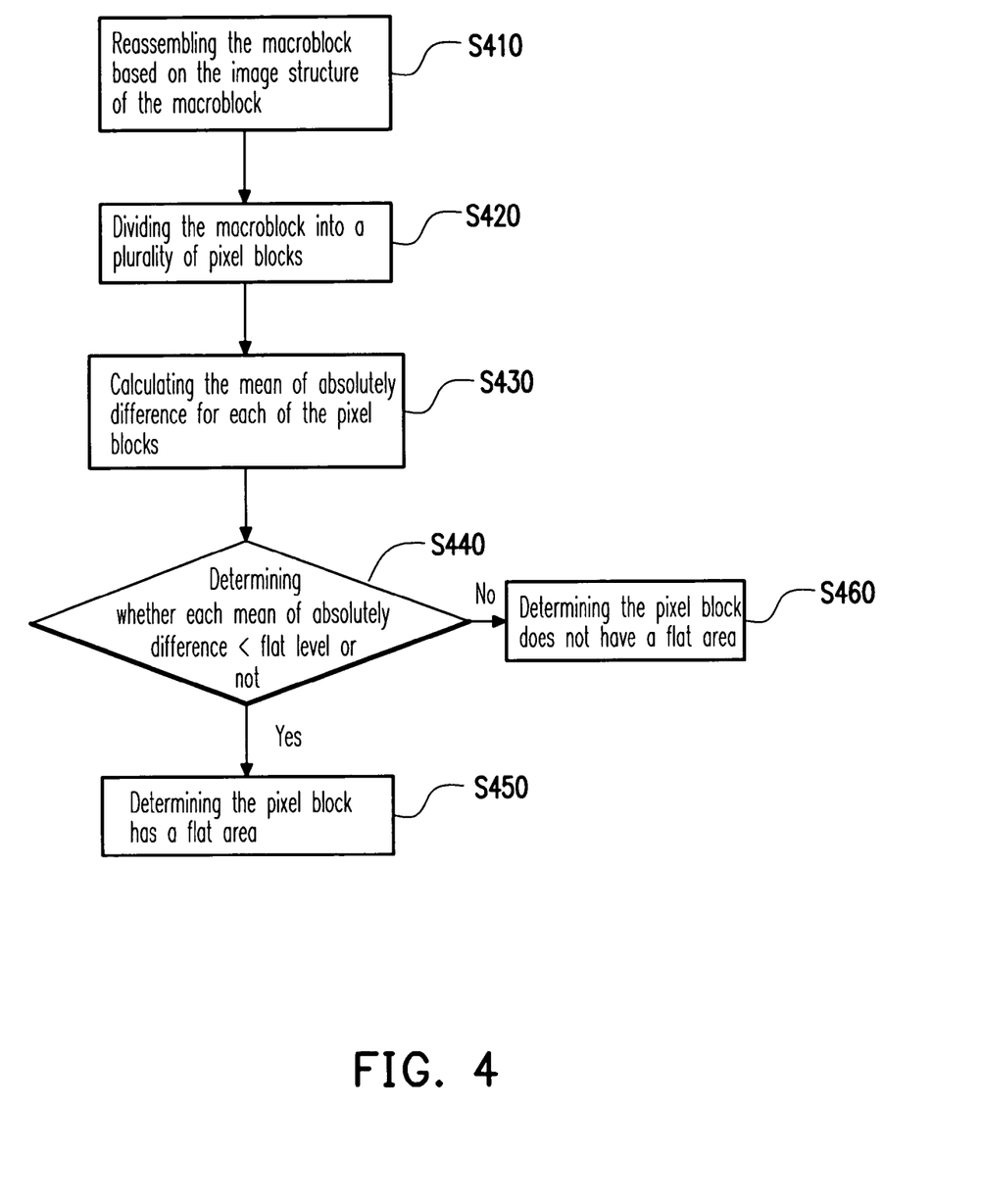
FIG. 4 schematically shows a flow chart illustrating a method for detecting the flat area in each pixel block of a macroblock according to a preferred embodiment of the present invention.

FIG. 4 schematically shows a flow chart illustrating a method for detecting the flat area in each pixel block of the macroblock according to a preferred embodiment of the present invention. First, the macroblock is reassembled based on the image structure of the macroblock (step S410). Then, the macroblock is divided into a plurality of pixel blocks (step S420), and the mean of absolutely difference for each of the pixel blocks is calculated (step S430).

Then, it is to determine whether each of the means of absolutely difference is less than a flat level or not (step S440). If the mean of absolutely difference is less than the flat level, it is determined that the pixel block has a flat area (step S450). Otherwise, it is determined that the pixel block does not have a flat area (step S460). Wherein, the formula to calculate the mean of absolutely difference of the pixel block having m pixels width and n pixels height is:

$$MAD = \sum_{i=0}^{n}\sum_{j=0}^{m} |(pixel_{i,j} - mean)|$$

Where MAD is the mean of absolutely difference, mean is the pixel mean, $pixel_{i,j}$ is the pixel value of the $(i+1)^{th}$ column and $(j+1)^{th}$ row pixel in the pixel block; m and n are natural numbers, and i and j are positive integers equal to and greater than 0.

Figure 5:
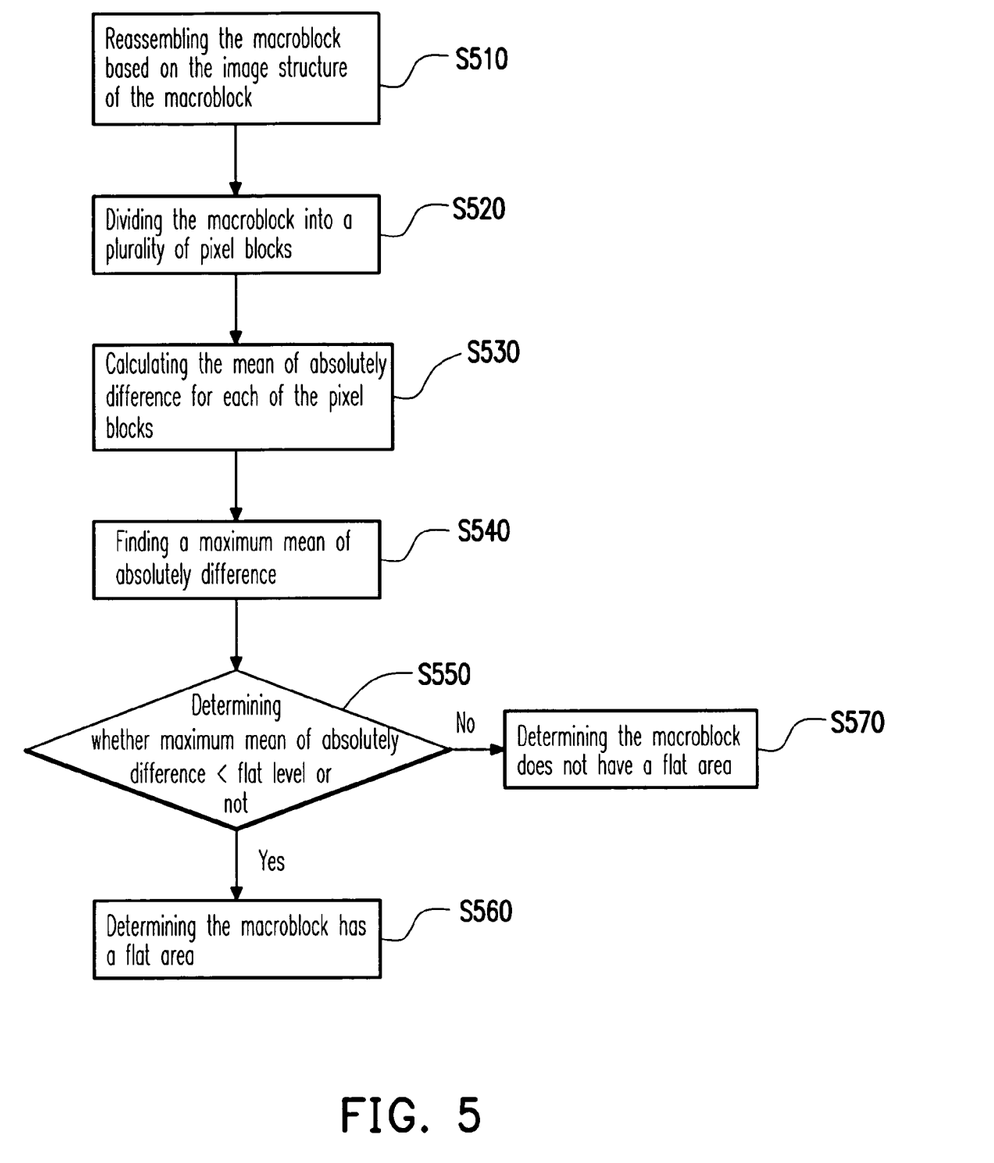
FIG. 5 schematically shows a flow chart illustrating a method for detecting the flat area in a macroblock according to another preferred embodiment of the present invention.

FIG. 5 schematically shows a flow chart illustrating a method for detecting the flat area in the macroblock according to another preferred embodiment of the present invention. First, the macroblock is reassembled based on the image structure of the macroblock (step S510). Then, the macroblock is divided into a plurality of pixel blocks (step S520), and the mean of absolutely difference for each of the pixel blocks is calculated (step S530).

Then, a maximum mean of absolutely difference is found from the means of absolutely difference (step S540). Afterwards, it is to determine whether the maximum mean of absolutely difference is less than a flat level or not (step S550). If the maximum mean of absolutely difference is less than the flat level, it is determined that the macroblock has a flat area (step S560). Otherwise, it is determined that the macroblock does not have a flat area (step S570).

Figure 6:
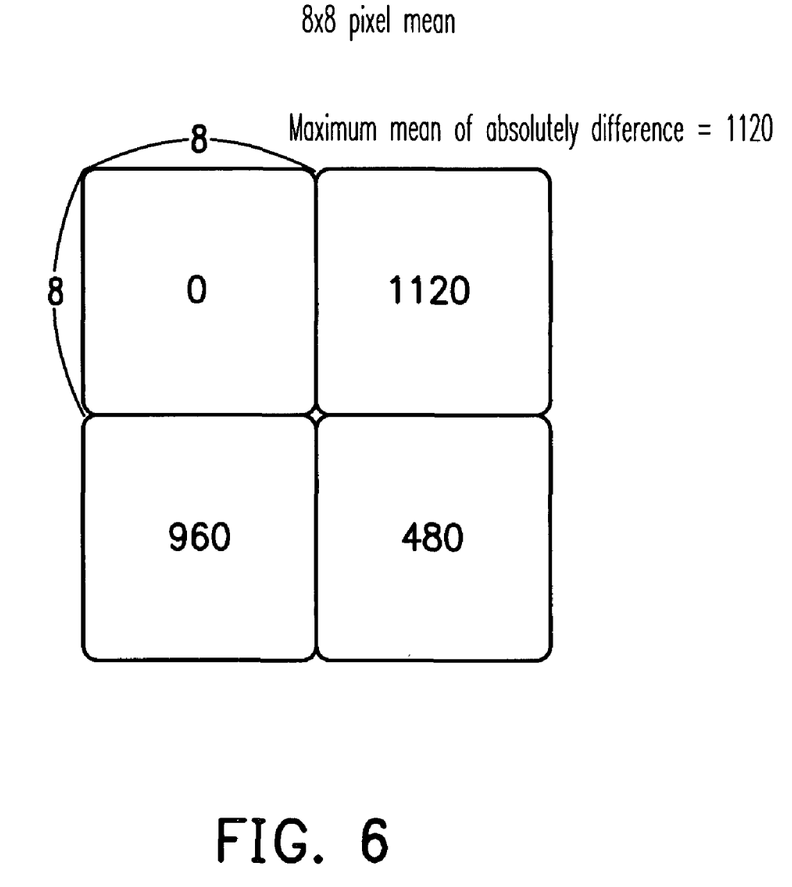
FIG. 6 schematically shows an example of a method for detecting the flat area in a macroblock according to a preferred embodiment of the present invention.

FIG. 6 schematically shows an example of a method for detecting the flat area in a macroblock according to a preferred embodiment of the present invention. First, the present embodiment divides a 16×16 macroblock into 4 8×8 macroblocks, and calculates the means of absolutely difference for the macroblocks respectively. Then, a maximum mean of absolutely difference is found and compared with a flat level. If the maximum mean of absolutely difference is less than the flat level, it is determined that the macroblock has a flat area.

Figure 7:
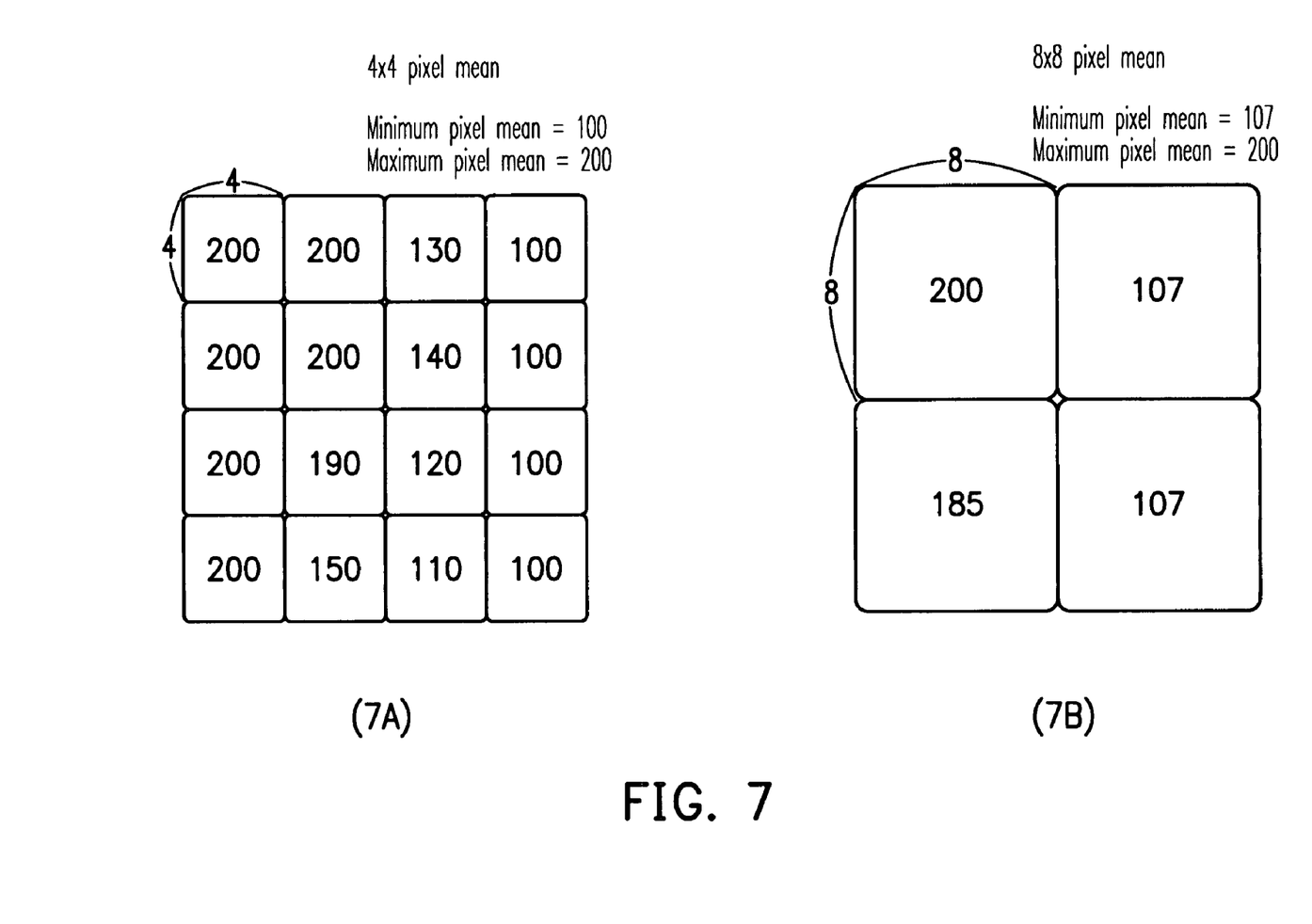
FIG. 7 schematically shows an example of a method for comparing the object edge with the flat area in a macroblock according to a preferred embodiment of the present invention.

FIG. 7 schematically shows an example of a method for comparing the object edge with the flat area in a macroblock according to a preferred embodiment of the present invention. Wherein, FIG. 7B is the same as FIG. 3 mentioned above, thus its description is omitted herein. In FIG. 7A, a 16×16 macroblock is divided into 16 4×4 macroblocks, and the pixel means for the pixel blocks are calculated respectively. Then, a maximum pixel mean and a minimum pixel mean are found from the pixel means and compared with each other. If the minimum pixel mean is much less than the maximum pixel mean, it is determined that the macroblock has an object edge.

It is known from the present embodiment, when the macroblock is divided into a plurality of pixel blocks with smaller size, the object edge strength for each of the pixel blocks is more precisely calculated, such that the shortcoming of error determination commonly occurred in detecting the object edge is effectively eliminated. Furthermore, the position and direction of the object edge are further determined based on the relative position of the pixel block corresponding to the minimum and maximum pixel means.

In the embodiments mentioned above, the object edge strength and the flat area strength are further classified based on different sets of various edge scaling factors and flat levels, such that the bit rate controller can understand more of the image characteristic in the macroblock and the quantization scaling factor can be precisely adjusted. Accordingly, the image compression result can provide an optimal visual mentality effect.

Figure 8:
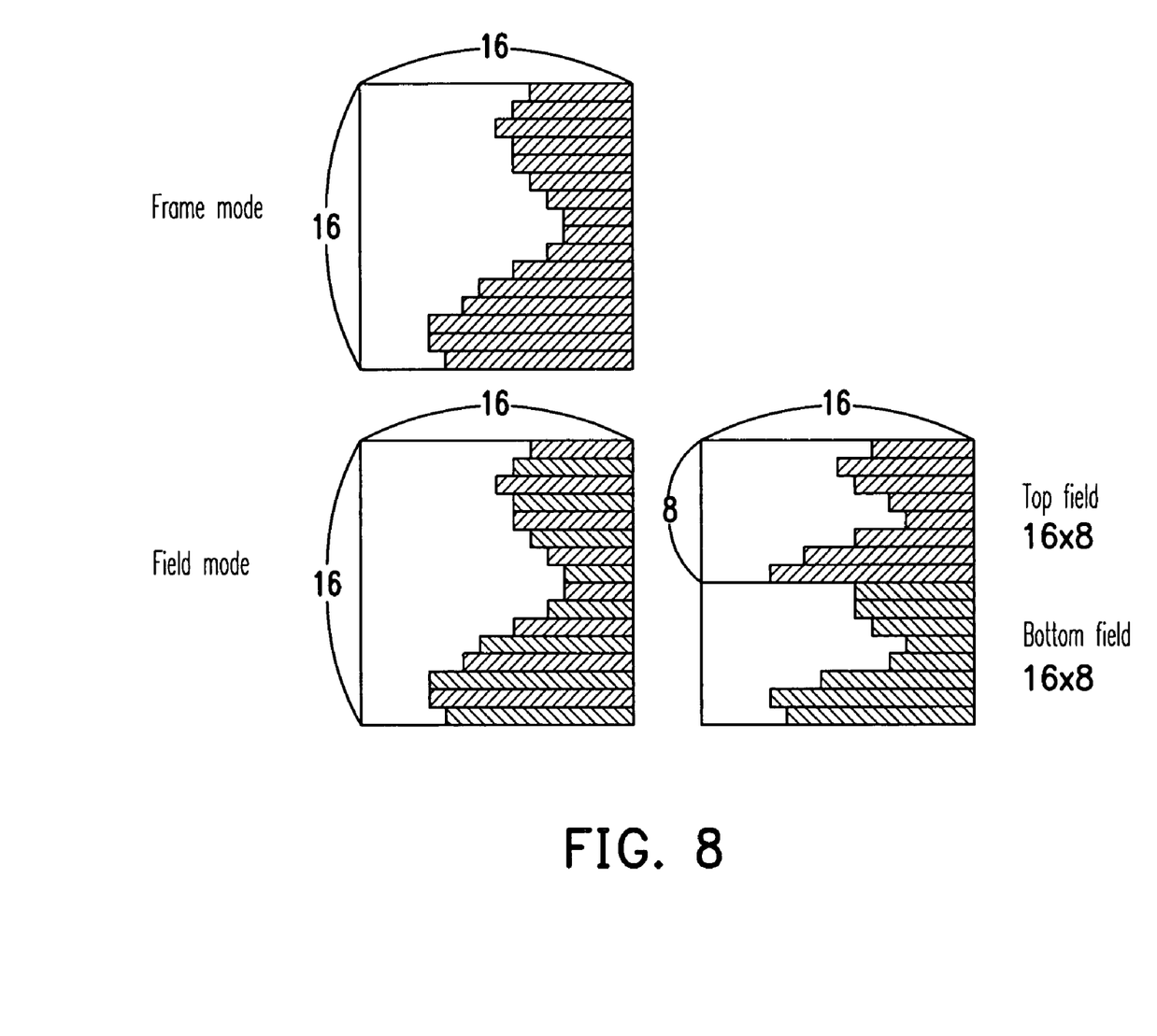
FIG. 8 schematically shows a diagram illustrating the reassembly of the macroblock based on the image structure according to a preferred embodiment of the present invention.

FIG. 8 schematically shows a diagram illustrating the reassembly of the macroblock based on the image structure according to a preferred embodiment of the present invention. If the structure is the frame mode, the macroblock is a 16×16 block formed by interlacing pixel lines of two fields. If it is the field mode, the macroblock is constituted of a 16×8 top field block and a 16×8 bottom field block on which pixel lines in two fields are arranged respectively.

Figure 9:
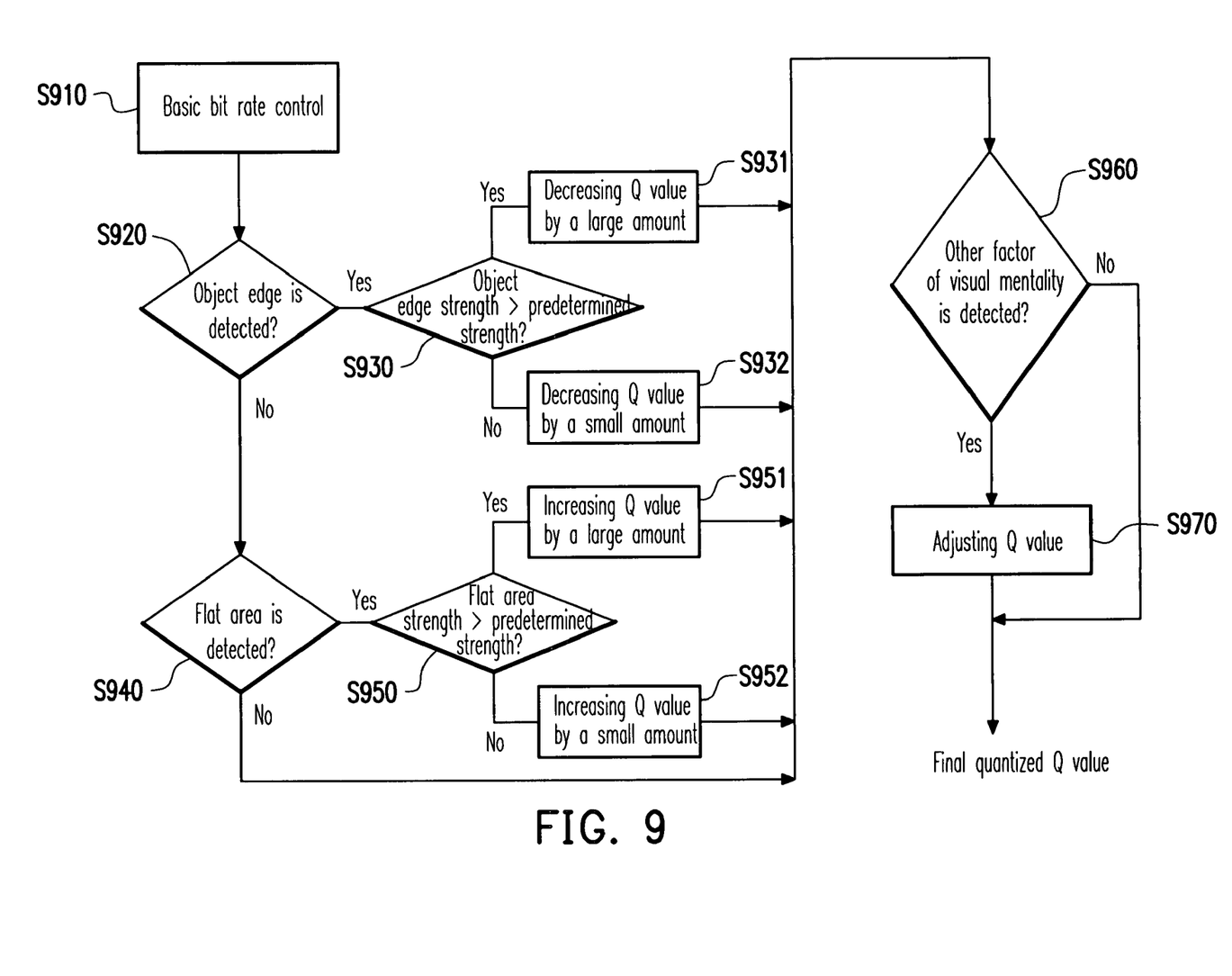
FIG. 9 schematically shows a flow chart illustrating a control method for the bit rate controller according to a preferred embodiment of the present invention.

FIG. 9 schematically shows a flow chart illustrating a controlling method for the bit rate controller according to a preferred embodiment of the present invention. The quantization scaling factor (Q value) of the bit rate controller is directly adjusted based on the detection result of the object edge and flat area in the present embodiment. The controlling method comprises the following steps. First, a quantization scaling factor is determined by a basic bit rate control algorithm (step S910). Then, it is adjusted based on the object edge and the flat area of the visual mentality, wherein the priority of the object edge is greater than the priority of the flat area; and it is to determine whether the object edge has been detected or not (step S920). If the object edge has been detected, it is to further determine whether the object edge strength is greater than a predetermined strength or not (step S930). If the object edge strength is greater than the predetermined strength, the Q value is decreased by a greater amount (step S931). Otherwise, if the object edge strength is lower than the predetermined strength, the Q value is decreased by a smaller amount (step S932).

In addition, if the object edge has not been detected, then it is to determine whether the flat area has been detected or not (step S940). If the flat area has been detected, it is to further determine whether the flat area strength is greater than a predetermined strength or not (step S950). If the flat area strength is greater than the predetermined strength, the Q value is increased by a greater amount (step S951). Otherwise, if the flat area strength is lower than the predetermined strength, the Q value is increased by a smaller amount (step S952).

Furthermore, if the flat area has not been detected or the Q value has been adjusted, it is to further determine whether other factor of visual mentality has been detected or not (step S960). If other factor of visual mentality has been detected, the Q value is adjusted based on the detected visual mentality (step S970). If other factor of visual mentality has not been detected or the Q value has been adjusted, the steps of determining final quantized Q value is completed.

In summary, in the method for detecting the object edge in a macroblock provided by the present invention, the pixel means and the means of absolutely difference for a plurality of pixel blocks in the macroblock are calculated and compared, so as to detect whether the macroblock has an object edge or a flat area. In addition, the image structure of the macroblock can be analyzed and classified, and the related information can be applied to the bit rate control. Accordingly, the visual effect of the compressed image is appropriately improved.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A method for detecting an object edge in a macroblock, wherein the macroblock is one of the macroblocks in an image frame, and the method for detecting the object edge in the macroblock comprises:
   dividing the macroblock into a plurality of pixel blocks;
   calculating a pixel mean for each of the pixel blocks; and
   comparing the pixel means of the pixel blocks, and determining whether the macroblock has the object edge or not, further comprising:
      finding a maximum pixel mean with a maximum value and a minimum pixel mean with a minimum value among the pixel means;
      multiplying the minimum pixel mean by an edge scaling factor for obtaining a comparison pixel mean and comparing the comparison pixel mean with the maximum pixel mean; and
      when the comparison pixel mean is less than the maximum pixel mean, determining the macroblock has the object edge.

2. The method for detecting the object edge in the macroblock of claim 1, further comprising:
   using a first edge scaling factor and a second edge scaling factor to detect a first object edge strength and a second object edge strength, respectively; and
   comparing the first object edge strength with the second object edge strength so as to distinguish the strength of the object edge.

3. The method for detecting the object edge in the macroblock of claim 1, wherein the formula to calculate the pixel mean of the pixel block having m pixels width and n pixels height is:

$$\text{mean} = \frac{\left(\sum_{i=0}^{n}\sum_{j=0}^{m} pixel_{i,j}\right)}{(n \times m)}$$

where mean is the pixel mean, $pixel_{i,j}$ is a pixel value of an $(i+1)^{th}$ column and $(j+1)^{th}$ row pixel in the pixel block; m and n are natural numbers, and i and j are positive integers equal to and greater than 0.

4. The method for detecting the object edge in the macroblock of claim 1, further comprising:
   calculating a mean of absolutely difference for each of the pixel blocks; and
   determining whether the macroblock has a flat area or not based on the means of absolutely difference of the pixel blocks.

5. The method for detecting the object edge in the macroblock of claim 4, wherein the steps of determining whether the macroblock has a flat area or not based on the means of absolutely difference of the pixel blocks comprise:
   comparing the mean of absolutely difference for each of the pixel blocks with a flat level; and
   if the means of absolutely difference are less than the flat level, determining the pixel blocks have the flat area.

6. The method for detecting the object edge in the macroblock of claim 4, wherein the steps of comparing the means of absolutely difference of the pixel blocks comprise:
   finding a maximum mean of absolutely difference with a maximum value among the means of absolutely difference;
   comparing the maximum mean of absolutely difference with a flat level; and
   if the maximum mean of absolutely difference is less than the flat level, determining the macroblock has the flat area.

7. The method for detecting the object edge in the macroblock of claim 6, further comprising:
   using a first flat level and a second flat level to detect a first flat area strength and a second flat area strength, respectively; and
   comparing the first flat area strength with the second flat area strength so as to distinguish the strength of the flat area.

8. The method for detecting the object edge in the macroblock of claim 4, wherein the formula to calculate the mean of absolutely difference of the pixel block having m pixels width and n pixels height is:

$$MAD = \sum_{i=0}^{n}\sum_{j=0}^{m} |(pixel_{i,j} - \text{mean})|$$

where MAD is the mean of absolutely difference, mean is the pixel mean, $pixel_{i,j}$ is the pixel value of the $(i+1)^{th}$ column and $(j+1)^{th}$ row pixel in the pixel block; m and n are natural numbers, and i and j are positive integers equal to and greater than 0.

9. The method for detecting the object edge in the macroblock of claim 1, further comprising reassembling the macroblock based on an image structure of the macroblock.

10. The method for detecting the object edge in the macroblock of claim 9, wherein if the image structure is a frame type, the pixel lines of two fields are interlaced with each other to form the macroblock.

11. The method for detecting the object edge in the macroblock of claim 9, wherein if the image structure is a field type, the pixel lines of two fields in two blocks are individually arranged and the two blocks are reassembled to form the macroblock.

12. The method for detecting the object edge in the macroblock of claim 1, wherein the steps of dividing the macroblock into the plurality of pixel blocks further comprise:

dividing the macroblock into a plurality of pixel blocks with a first size and a second size in order to detect a first object edge strength and a second object edge strength, respectively; and comparing the first object edge strength with the second object edge strength so as to distinguish the strength of the object edge.

13. A method for deciding a quantization scaling factor suitable for controlling a bit rate of image encoding in a macroblock, the method for deciding the quantization scaling factor comprising:

detecting whether the macroblock has an object edge or not;

if the macroblock has the object edge, decreasing the quantization scaling factor;

detecting whether the macroblock has a flat area or not; and if the macroblock has the flat area, increasing the quantization scaling factor.

14. The method for deciding the quantization scaling factor of claim 13, wherein after determining whether the macroblock has an object edge or not, further comprises:

detecting an object edge strength, and comparing the object edge strength with a predetermined strength;

if the object edge strength is greater than the predetermined strength, the quantization scaling factor is decreased by a first scaling amount; and if the object edge strength is lower than the predetermined strength, the quantization scaling factor is decreased by a second scaling amount, wherein the first scaling amount is greater than the second scaling amount.

15. The method for deciding the quantization scaling factor of claim 13, wherein after determining whether the macroblock has a flat area or not, further comprises:

detecting a flat area strength, and comparing the flat area strength with a predetermined strength;

if the flat area strength is greater than the predetermined strength, the quantization scaling factor is increased by a first scaling amount; and if the flat area strength is lower than the predetermined strength, the quantization scaling factor is increased by a second scaling amount, wherein the first scaling amount is greater than the second scaling amount.

16. The method for deciding the quantization scaling factor of claim 13, wherein if both the object edge and the flat area are detected, the object edge is considered primarily for adjusting the quantization scaling factor.

* * * * *